United States Patent
Lin et al.

(10) Patent No.: US 7,952,993 B2
(45) Date of Patent: May 31, 2011

(54) AUTOMATIC NETWORK CONNECTION DEVICE AND METHOD THEREOF

(75) Inventors: Hou-Yuan Lin, Taipei County (TW); Chen-Shun Chen, Taipei County (TW)

(73) Assignee: GIGA-BYTE Technology Co., Ltd, Hsin-Tien, Taipei County (TW)

( * ) Notice: Subject to any disclaimer, the term of this patent is extended or adjusted under 35 U.S.C. 154(b) by 153 days.

(21) Appl. No.: 12/403,423

(22) Filed: Mar. 13, 2009

(65) Prior Publication Data

US 2010/0232289 A1 Sep. 16, 2010

(51) Int. Cl.
*H04L 12/26* (2006.01)
(52) U.S. Cl. .......................................... 370/221; 714/13
(58) Field of Classification Search .......... 370/216–228; 714/4, 13
See application file for complete search history.

(56) References Cited

FOREIGN PATENT DOCUMENTS

| EP | 1 768 320 A | 3/2007 |
| WO | WO-01/95564 A | 12/2001 |

OTHER PUBLICATIONS

Hiroshi Ohta et al., "Hitless Line Protection Switching Method for ATM Networks", 1993IEEE, pp. 272-276.

*Primary Examiner* — Ricky Ngo
*Assistant Examiner* — Gary Mui
(74) *Attorney, Agent, or Firm* — Ming Chun Chou

(57) ABSTRACT

An automatic network connection device includes a first connection port, a second connection port, a first network connection unit, a second network connection unit, a control unit, and a switching unit. When the first network connection unit operates normally, the switching unit electrically connects the first network connection unit to the first connection port, such that the first network connection unit transmits and receives a network signal. When the first network connection unit fails, the switching unit switches the first connection port to be electrically connected to the second network connection unit, such that the second network connection unit transmits and receives the network signal.

6 Claims, 6 Drawing Sheets

AUTOMATIC NETWORK CONNECTION DEVICE AND METHOD THEREOF

BACKGROUND OF THE INVENTION

1. Field of the Invention

The present invention relates to a network connection device and a method thereof, and more particularly to an automatic network connection device and a method thereof.

2. Related Art

In recent years, with the rapid growth and wide expansion of the applications of the Internet, a network chip plays a more and more important role.

Generally, motherboards of computer systems all have network chips. The network chip includes one or more high-performance microprocessors such as standard reduced-instruction processors and processors with special processing functions, and is mainly characterized in that network processing functions thereof are controlled by programs.

Since microprocessors are built in the network chip, software used for development has become a key point of applications of the network chip. Therefore, the combination of software and hardware is crucial to the applications of the network chip. The architectures of the network chip are mostly multi-microprocessor designs that can achieve desired efficacies by utilizing a high computing capability in combination with corresponding software.

Currently, most motherboards are configured with two network chips, so as to increase various possible uses of the two network chips.

However, when a network chip in use is damaged suddenly and cannot work normally, a user must change the inserting position of a network cable manually in order to use the other network chip. Therefore, although two network chips are configured, it is still rather inconvenient in use and lacks of an automatic response mechanism.

SUMMARY OF THE INVENTION

Accordingly, the present invention is directed to an automatic network connection device and a method thereof, so as to solve the problem in the prior art that when a network chip in use is damaged suddenly and cannot work normally, a user must change the inserting position of a network cable manually in order to use the other network chip.

The present invention provides an automatic network connection device, which includes a first connection port, a second connection port, a first network connection unit, a second network connection unit, a control unit, and a switching unit.

The first network connection unit is electrically connected to the first connection port. The second network connection unit is electrically connected to the second connection port. The control unit is electrically connected to the first network connection unit and the second network connection unit, for controlling operations of the first network connection unit and the second network connection unit. The switching unit is used for electrically connecting one of the first network connection unit and the second network connection unit to one of the first connection port and the second connection port.

When the first network connection unit operates normally, the switching unit electrically connects the first network connection unit to the first connection port, such that the first network connection unit transmits and receives a network signal. When the first network connection unit fails, the switching unit switches the first connection port to be electrically connected to the second network connection unit, such that the second network connection unit transmits and receives the network signal.

In addition, the automatic network connection device further includes a start unit for starting the control unit to control operations of the second network connection unit.

Moreover, the start unit may be disposed in the first network connection unit, the second network connection unit, or the control unit.

The present invention also provides an automatic network connection method, which includes the following steps. First, a network signal is transmitted and received via a first network connection unit. Then, it is detected in real time that an error occurs to the first network connection unit. Afterward, an address of the first network connection unit is replicated to a second network connection unit. Finally, after the address is successfully replicated, the network signal is transmitted and received via the second network connection unit.

In addition, the automatic network connection method further includes starting to operate the second network connection unit.

To sum up, in the present invention, when it is detected that an error occurs to the first network connection unit, the address of the first network connection unit may be replicated to a second network connection unit, and then, the control unit is started to control the second network connection unit, and the first connection port is switched to be electrically connected to the second network connection unit by the switching unit, such that the second network connection unit transmits and receives the network signal. Therefore, there is no need to change the connecting position of a network cable manually.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the disclosure of the specification, claims, and drawings, those skilled in the art can easily understand the relevant objectives and advantages of the present invention. The following embodiments are intended to describe the present invention in further detail, but not intended to limit the scope of the present invention in any way.

Figure 1:
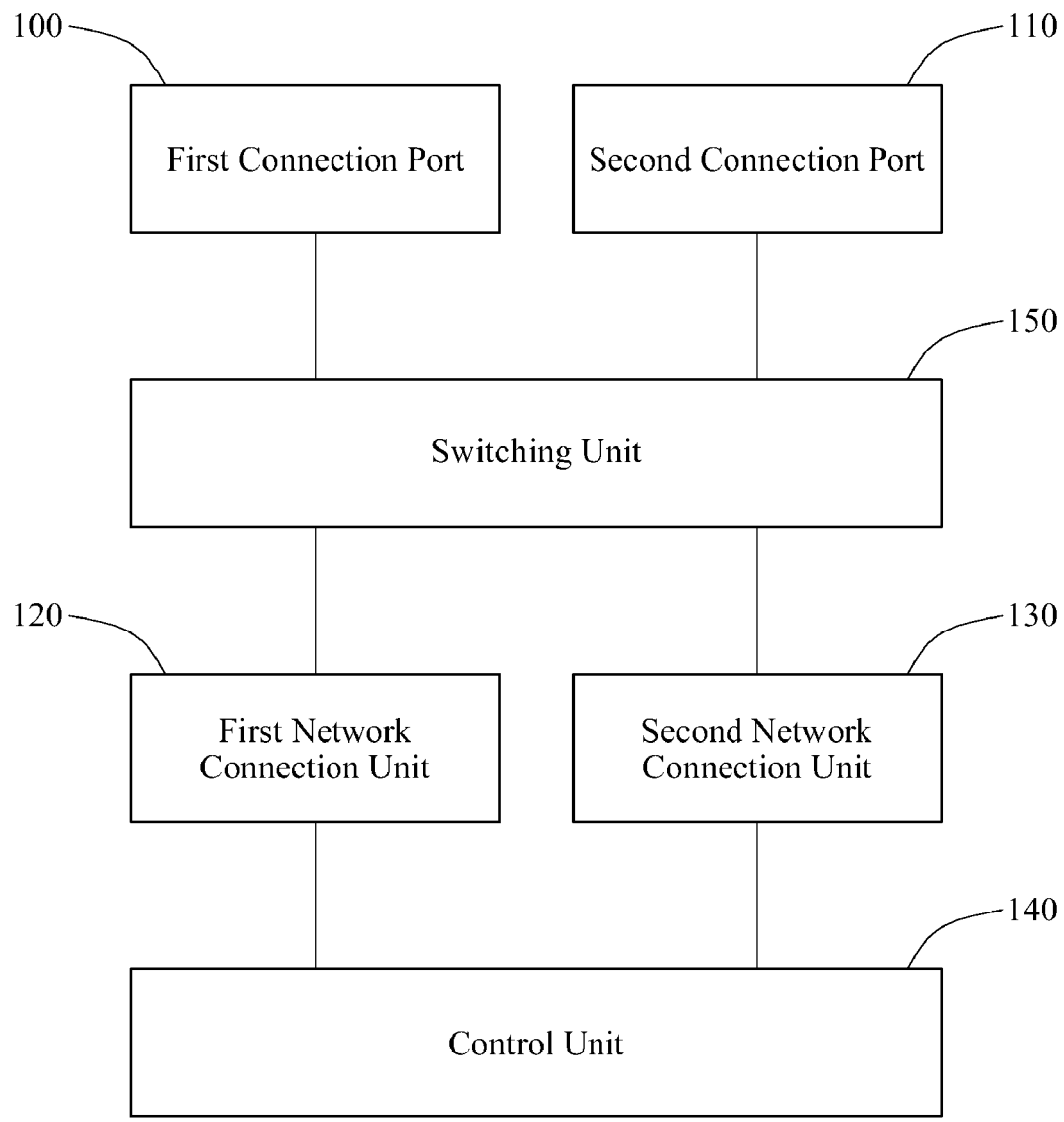
FIG. 1 is a block diagram of an automatic network connection device according to an embodiment of the present invention.

FIG. 1 is a block diagram of an automatic network connection device according to an embodiment of the present invention.

Referring to FIG. 1, an automatic network connection device includes a first connection port 100, a second connection port 110, a first network connection unit 120, a second network connection unit 130, a control unit 140, and a switching unit 150.

The first network connection unit 120 is electrically connected to the first connection port 100. The second network connection unit 130 is electrically connected to the second connection port 110. The control unit 140 is electrically connected to the first network connection unit 120 and the second network connection unit 130. The switching unit 150 is electrically connected to the first connection port 100, the second connection port 110, the first network connection unit 120, and the second network connection unit 130.

The first connection port 100 and the second connection port 110 may be connected to a network cable. The first network connection unit 120 and the second network connection unit 130 are used to transmit and receive a network signal. The switching unit 150 selects to electrically connect one of the first network connection unit 120 and the second network connection unit 130 to one of the first connection port 100 and the second connection port 110. The control unit 140 controls operations of the first network connection unit 120 and the second network connection unit 130.

When the first network connection unit 120 operates normally, the switching unit 150 electrically connects the first network connection unit 120 to the first connection port 100, such that the first network connection unit 120 transmits and receives a network signal. When the first network connection unit 120 cannot work normally due to a failure or other factors, the switching unit 150 automatically switches the first connection port 100 to be electrically connected to the second network connection unit 130, such that the second network connection unit 130 transmits and receives the network signal.

For example, when a computer is connected to the Internet via the first network connection unit 120 (for example, a first network chip), the first connection port 100 is connected to a network cable, the first network connection unit 120 transmits and receives a network signal, and the control unit 140 (for example, a south bridge chip) controls operations of the first network connection unit 120. When the first network connection unit 120 fails, the switching unit 150 automatically switches the first connection port 100 to be electrically connected to the second network connection unit 130 (for example, a second network chip), such that the second network connection unit 130 transmits and receives the network signal. Therefore, the second network connection unit 130 can be used without changing to insert the network cable into the second connection port 110 manually. Herein, the switching unit 150 can perform an automatic switching by a combination of software and hardware.

Figure 2:
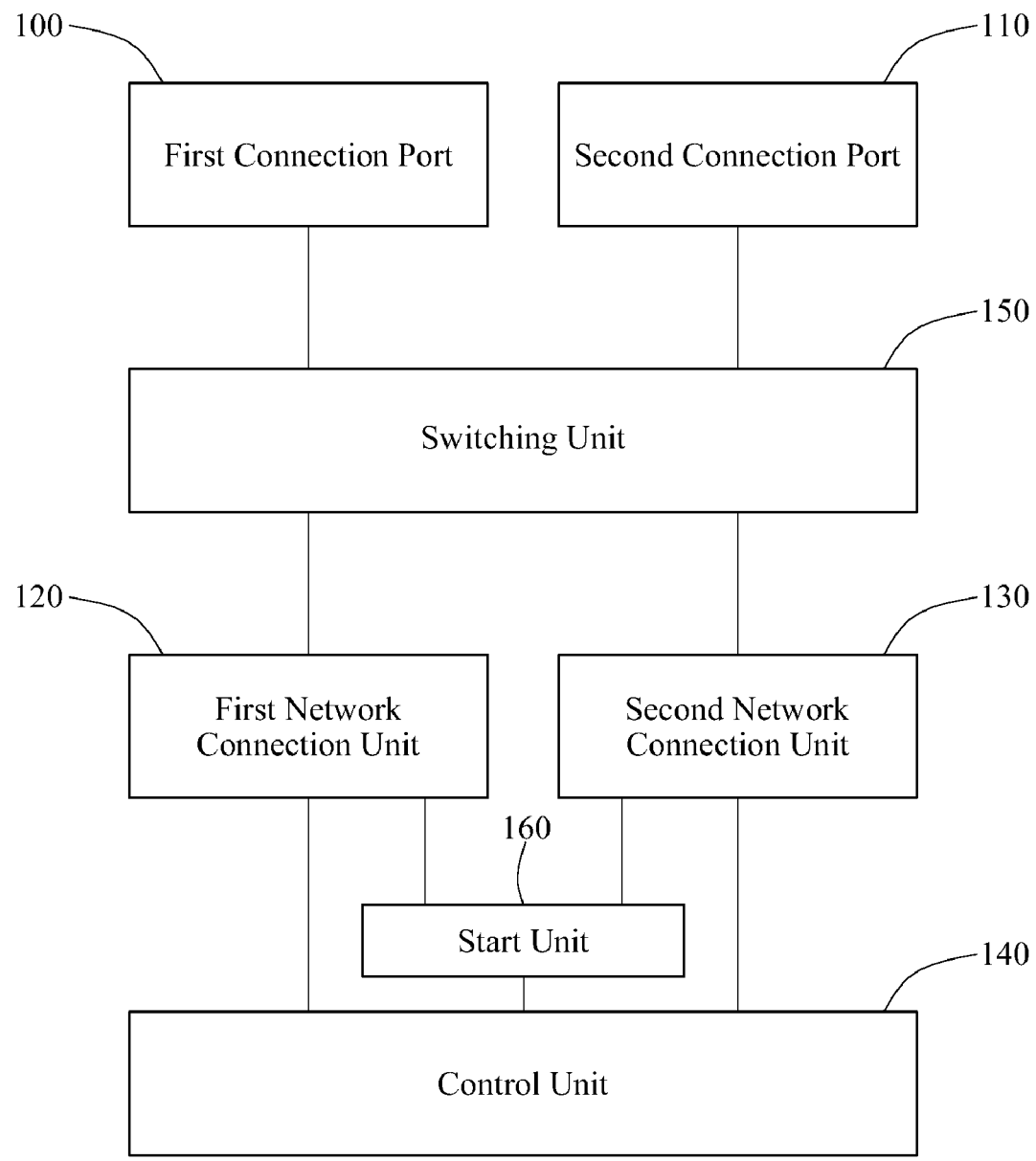
FIG. 2 is a block diagram of an automatic network connection device according to an embodiment of the present invention.

FIG. 2 is a block diagram of an automatic network connection device according to an embodiment of the present invention.

Referring to FIG. 2, this embodiment further includes a start unit 160. When the first network connection unit 120 fails, the start unit 160 starts the control unit 140 to control operations of the second network connection unit 130.

For example, when the first network connection unit 120 (for example, the first network chip) fails, the switching unit 150 automatically switches the first connection port 100 to be electrically connected to the second network connection unit 130 (for example, the second network chip), and then, the start unit 160 starts the control unit 140 (for example, the south bridge chip) to control the operations of the second network connection unit 130, such that the second network connection unit 130 starts to transmit and receive the network signal. Herein, the start unit 160 can be automatically started by a combination of software and hardware.

Figure 3A:
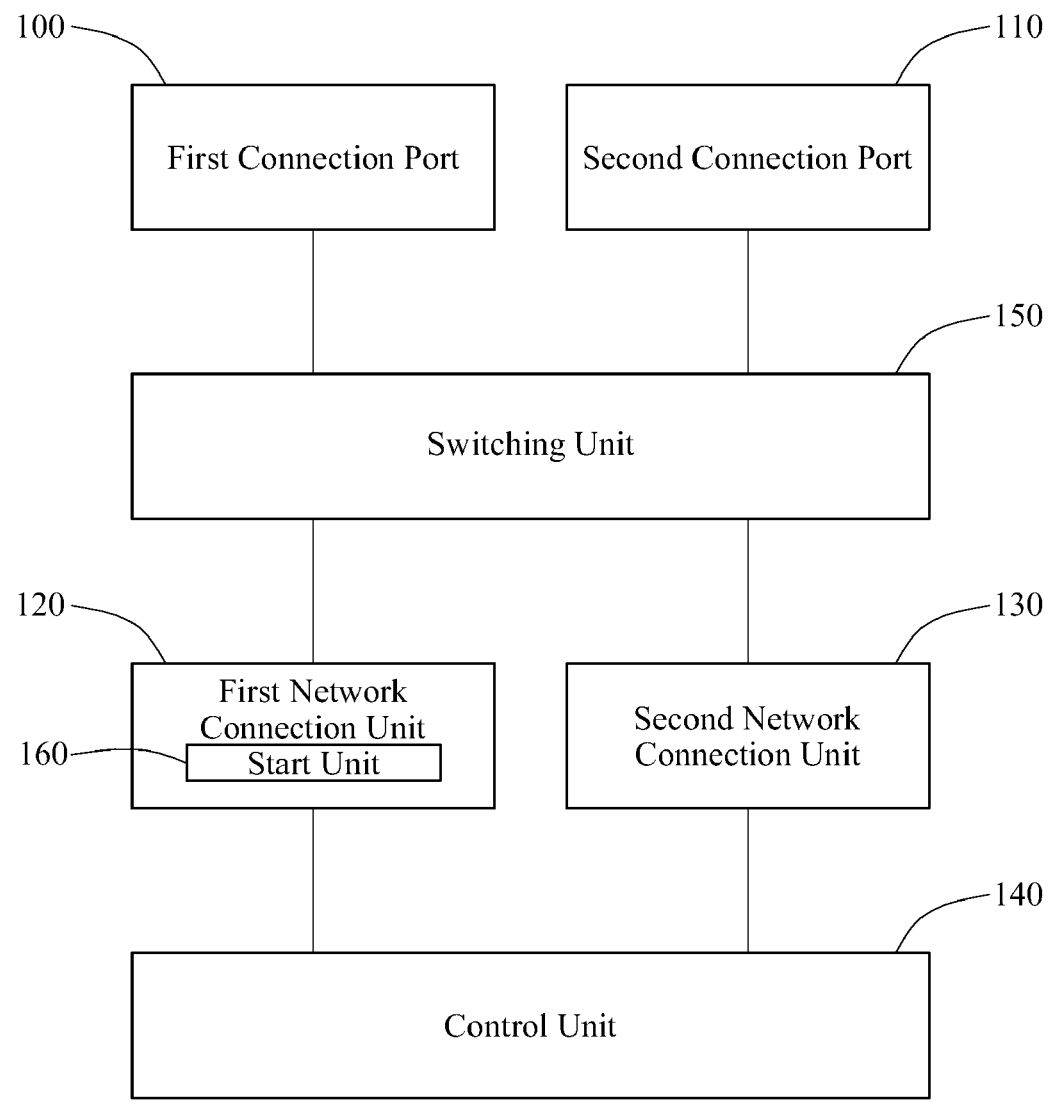
FIG. 3A is a block diagram of an automatic network connection device according to an embodiment of the present invention.

FIG. 3A is a block diagram of an automatic network connection device according to an embodiment of the present invention, in which the start unit 160 is selectively disposed in the first network connection unit 120.

Figure 3B:
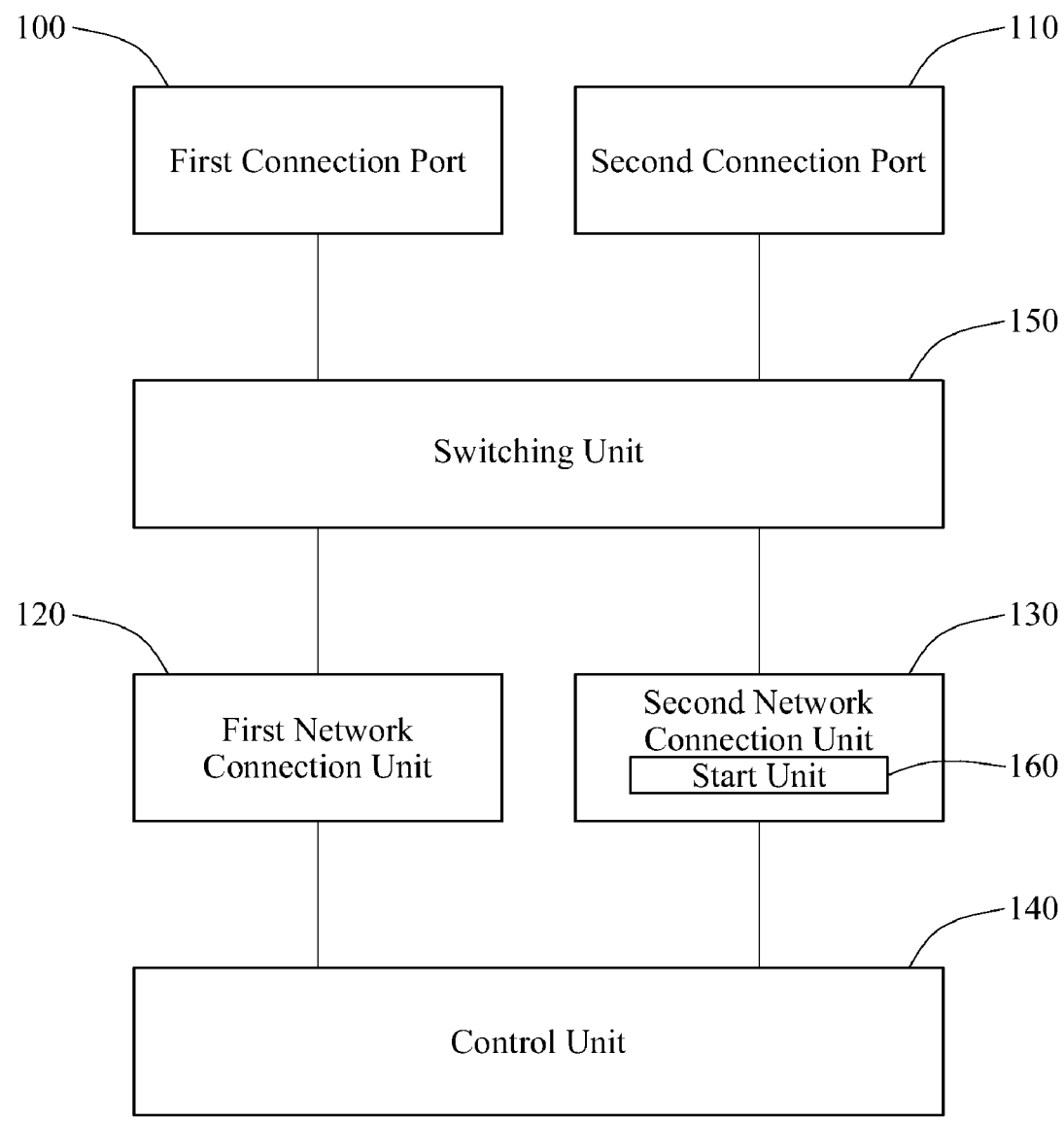
FIG. 3B is a block diagram of an automatic network connection device according to an embodiment of the present invention.

FIG. 3B is a block diagram of an automatic network connection device according to an embodiment of the present invention, in which the start unit 160 is selectively disposed in the second network connection unit 130.

Figure 3C:
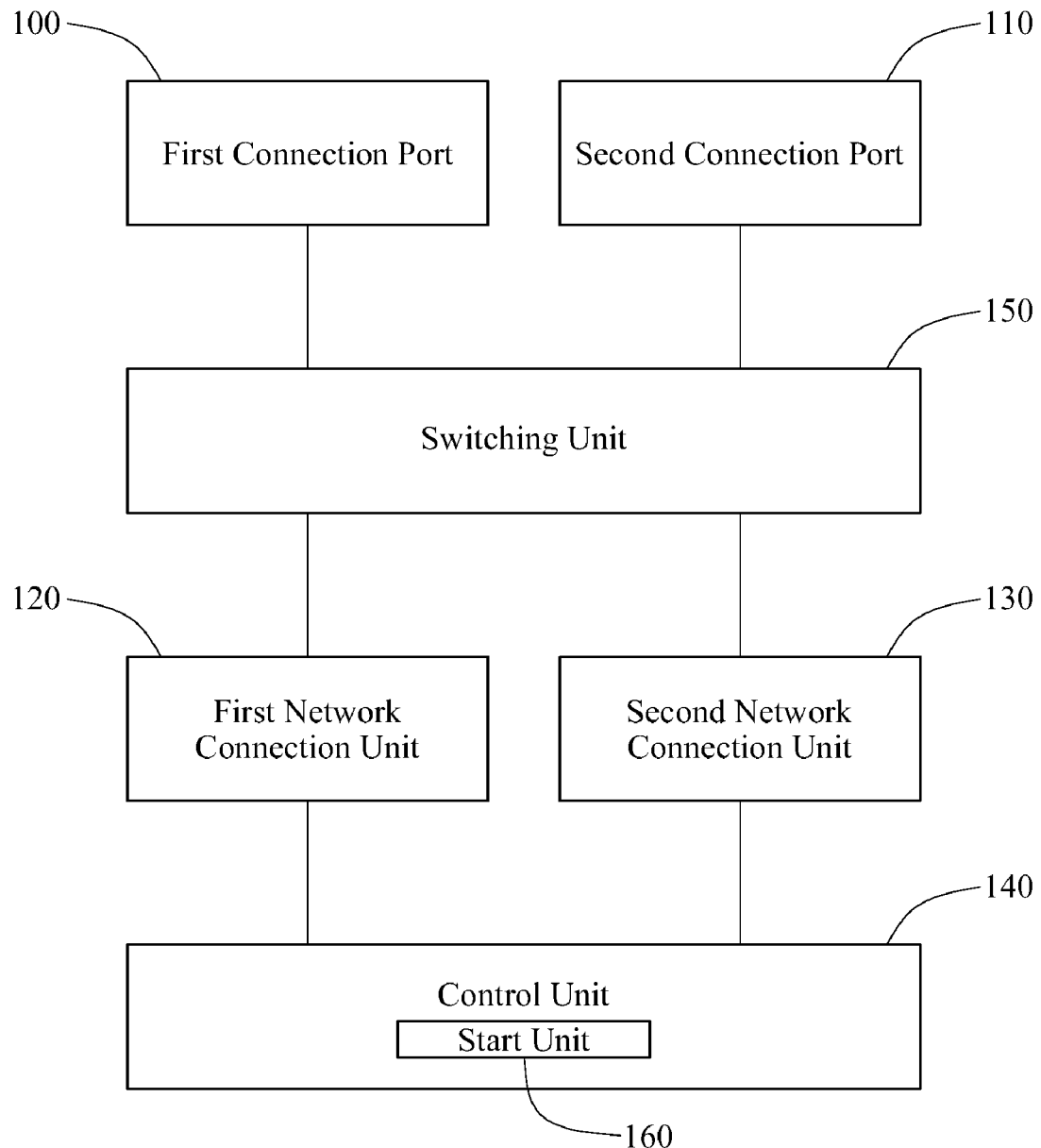
FIG. 3C is a block diagram of an automatic network connection device according to an embodiment of the present invention.

FIG. 3C is a block diagram of an automatic network connection device according to an embodiment of the present invention, in which the start unit 160 is selectively disposed in the control unit 140.

An automatic network connection method will be described below in further detail.

Figure 4:
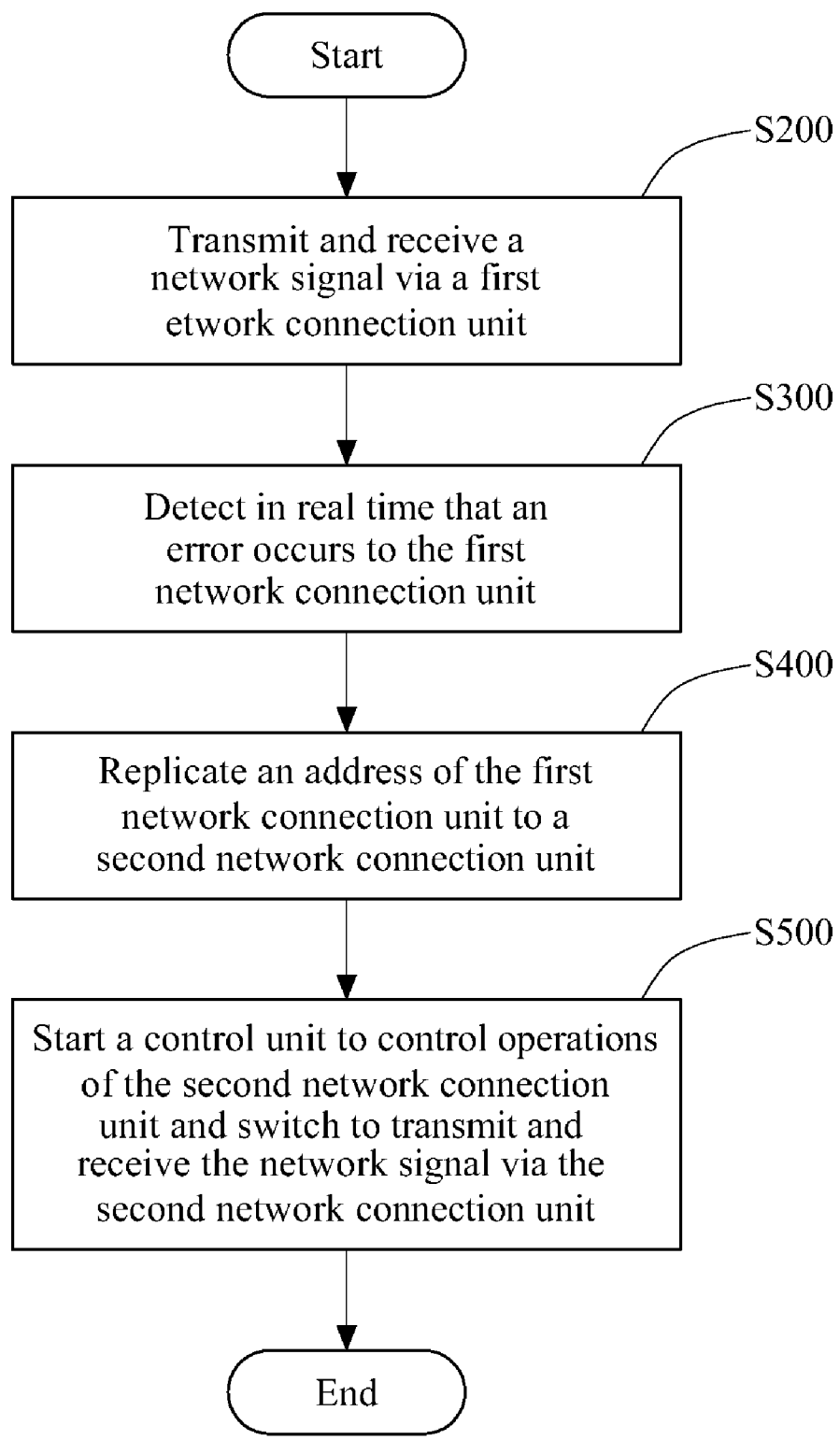
FIG. 4 is a flow chart of an automatic network connection method according to an embodiment of the present invention.

FIG. 4 is a flow chart of an automatic network connection method according to an embodiment of the present invention.

Referring to FIG. 4, an automatic network connection method includes the following steps. A network signal is transmitted and received via a first network connection unit 120 (Step S200). Then, it is detected in real time that an error occurs to the first network connection unit 120 (Step S300). Afterward, an address of the first network connection unit 120 is replicated to a second network connection unit 130 (Step S400). Finally, a control unit 140 is started to control operations of the second network connection unit 130, so that the network signal is transmitted and received via the second network connection unit 130 (Step S500).

For example, when a computer is connected to the Internet via the first network connection unit 120 (for example, a first network chip), a first connection port 100 is connected to a network cable, the first network connection unit 120 transmits and receives a network signal, and the control unit 140 (for example, a south bridge chip) controls operations of the first network connection unit 120. When the first network connection unit 120 fails, it is detected in real time by a combination of software and hardware that an error occurs to the first network connection unit 120, an address (for example, MAC ADDRESS) of the first network connection unit 120 is replicated to the second network connection unit 130 (for example, a second network chip) via the software or hardware, a start unit 160 starts the control unit 140 to control the operations of the second network connection unit 130, and a switching unit 150 automatically switches the first connection port 100 to be electrically connected to the second network connection unit 130, such that the second network connection unit 130 transmits and receives the network signal. Therefore, the second network connection unit 130 can be used directly, without changing to insert the network cable into a second connection port 110 manually.

To sum up, in the present invention, when it is detected by a combination of software and hardware that an error occurs to the first network connection unit 120, the address of the first network connection unit 120 is replicated to the second network connection unit 130, and then, the control unit 140 is started to control the operations of the second network connection unit 130, and the first connection port 100 is switched to be electrically connected to the second network connection unit 130 by the switching unit 150, such that the second network connection unit 130 transmits and receives the network signal. Therefore, the switching motion can be automatically performed without changing the connecting position of a network cable manually.

What is claimed is:

1. An automatic network connection device, comprising:
   a first connection port;
   a second connection port;
   a first network connection unit, electrically connected to the first connection port;
   a second network connection unit, electrically connected to the second connection port;
   a control unit, electrically connected to the first network connection unit and the second network connection unit, for controlling operations of the first network connection unit and the second network connection unit; and
   a switching unit, for electrically connecting one of the first network connection unit and the second network connection unit to one of the first connection port and the second connection port;
   wherein when the first network connection unit operates normally, the switching unit electrically connects the first network connection unit to the first connection port, such that the first network connection unit transmits and receives a network signal; and when the first network connection unit fails, the switching unit switches the first connection port to be electrically connected to the second network connection unit, such that the second network connection unit transmits and receives the network signal.

2. The automatic network connection device according to claim 1, further comprising: a start unit, for starting the control unit to control operations of the second network connection unit.

3. The automatic network connection device according to claim 2, wherein the start unit is disposed in the first network connection unit.

4. The automatic network connection device according to claim 2, wherein the start unit is disposed in the second network connection unit.

5. The automatic network connection device according to claim 2, wherein the start unit is disposed in the control unit.

6. The automatic network connection device according to claim 1, wherein the control unit is a south bridge unit.

* * * * *